US011125963B2

(12) United States Patent
Herman et al.

(10) Patent No.: US 11,125,963 B2
(45) Date of Patent: Sep. 21, 2021

(54) APPARATUS AND METHODS FOR CHANNEL VERIFICATION OF MULTI-FIBER OPTIC CABLE

(71) Applicant: Sumix Corporation, Oceanside, CA (US)

(72) Inventors: Phillip Herman, McKinney, TX (US); Yurii Snisarenko, Kyiv (UA); Yurii Chermianin, Kyiv (UA); Oleksii Kovalchuk, Kyiv (UA); Andrii Fesenko, Kyiv (UA); Farhad Towfiq, Oceanside, CA (US)

(73) Assignee: SUMIX CORPORATION, Oceanside, CA (US)

( * ) Notice: Subject to any disclaimer, the term of this patent is extended or adjusted under 35 U.S.C. 154(b) by 36 days.

(21) Appl. No.: 16/276,568

(22) Filed: Feb. 14, 2019

(65) Prior Publication Data
US 2020/0264397 A1    Aug. 20, 2020

(51) Int. Cl.
*G02B 6/44* (2006.01)
*G02B 6/38* (2006.01)

(52) U.S. Cl.
CPC ......... *G02B 6/4471* (2013.01); *G02B 6/3809* (2013.01); *G02B 6/3895* (2013.01); *G02B 6/3898* (2013.01)

(58) Field of Classification Search
CPC .. G02B 6/4471; G02B 6/3809; G02B 6/3895; G02B 6/3898
See application file for complete search history.

(56) References Cited

U.S. PATENT DOCUMENTS

| | | | | |
|---|---|---|---|---|
| 6,398,424 B1 * | 6/2002 | Jin | ........................ | G02B 6/3696 385/59 |
| 6,913,397 B2 * | 7/2005 | Kang | .................... | G02B 6/3672 29/564.2 |
| 10,012,563 B1 * | 7/2018 | Wang | .................. | G01M 11/3136 |
| 10,175,142 B2 * | 1/2019 | Lafrance | ................ | G02B 6/385 |
| 10,288,524 B2 * | 5/2019 | Leclerc | ............. | G01M 11/3136 |
| 10,481,041 B2 * | 11/2019 | Schell | .................. | G01M 11/335 |

(Continued)

OTHER PUBLICATIONS

Fiberstore, Fiber Optic Inspection—Does It Matter? Jan. 19, 2017, Available at http://www.chinacablesbuy.com/fiber-optic-inspection-does-it-matter.html (Year: 2017).*

(Continued)

*Primary Examiner* — Peter Radkowski
(74) *Attorney, Agent, or Firm* — Loza & Loza, LLP; Heidi Eisenhut

(57) ABSTRACT

The present disclosure provides a Multi-fiber push on (MPO) connector channel verification apparatus and method for verifying the MPO cable polarity and each optic fiber position in MPO cables or patch-cords. The apparatus includes a verification module that provides an illumination source configured to direct light on fiber end faces in an MPO connector at an end of the MPO cable according to predetermined sequences such that an inspection microscope at the other end of the MPO cable may be utilized to analyze the illumination sequence of illuminated fibers occurring at the other end of the MPO cable to verify the channel locations and polarity of the MPO cable.

16 Claims, 9 Drawing Sheets

(56) References Cited

U.S. PATENT DOCUMENTS

| | | | | |
|---|---|---|---|---|
| 2002/0081067 | A1* | 6/2002 | Brun | G02B 6/2938 |
| | | | | 385/34 |
| 2004/0042733 | A1* | 3/2004 | Kang | G02B 6/3834 |
| | | | | 385/71 |
| 2015/0104135 | A1* | 4/2015 | Bushnell | G02B 6/3885 |
| | | | | 385/79 |
| 2016/0061690 | A1* | 3/2016 | Elkins, II | G01M 11/33 |
| | | | | 356/73.1 |
| 2017/0003195 | A1* | 1/2017 | Lafrance | G02B 6/385 |
| 2017/0234767 | A1* | 8/2017 | Leclerc | G01M 11/3136 |
| | | | | 356/73.1 |
| 2018/0340861 | A1* | 11/2018 | Schell | G01M 11/333 |

OTHER PUBLICATIONS

Fluke Networks, MultiFiberPro, Datasheet, Jun. 13, 2014, available at https://www.flukenetworks.com/datacom-cabling/fiber-testing/multifiber-pro-optical-power-meter-and-fiber-testing-kits (Year: 2014).*

Lowe et al., Multimode Fiber Optics: Users' Guide for Instructors, Physics Department, Loyola University Maryland, Baltimore, MD 21210, Jul. 2013 (Year: 2013).*

* cited by examiner

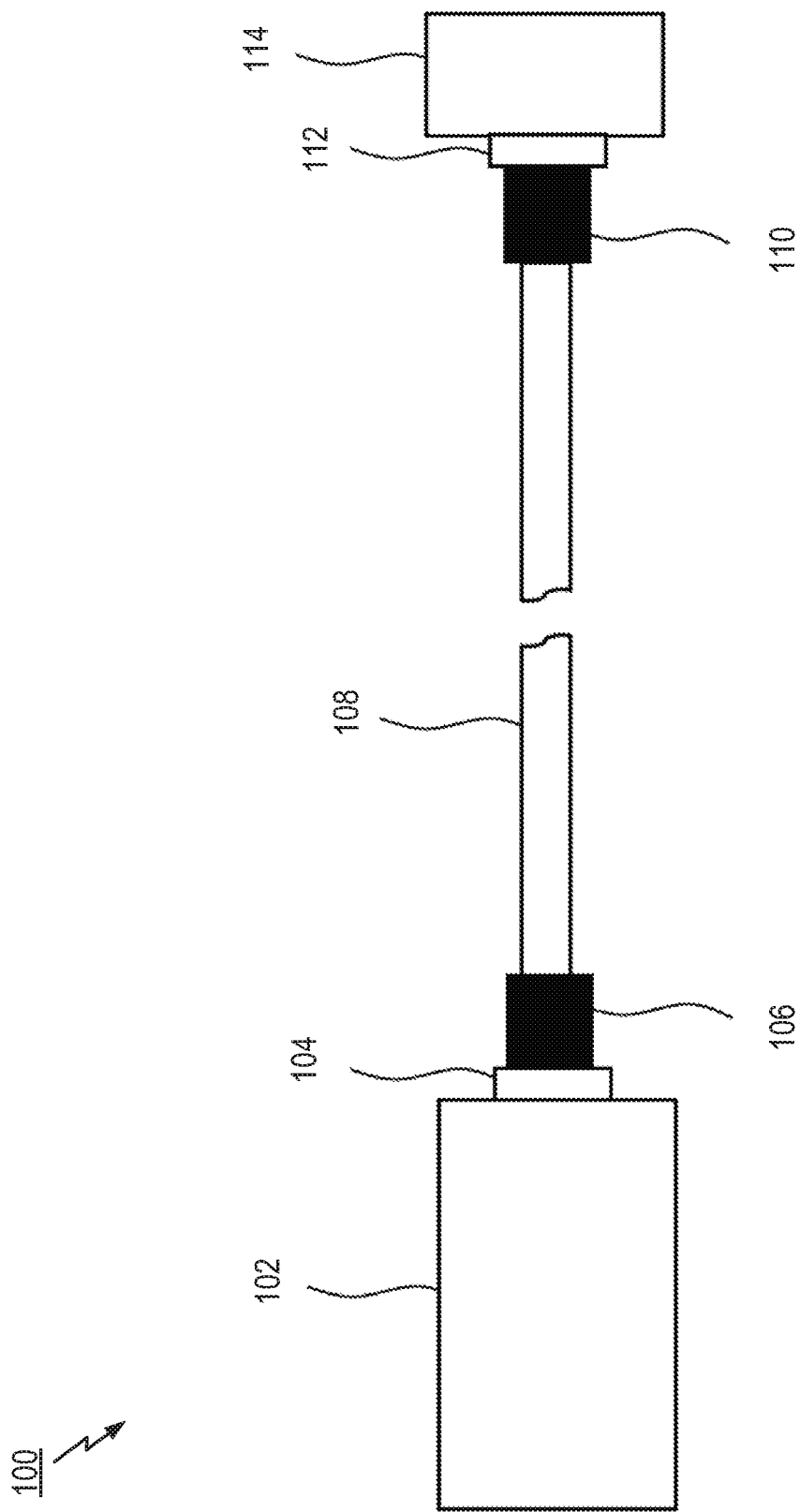

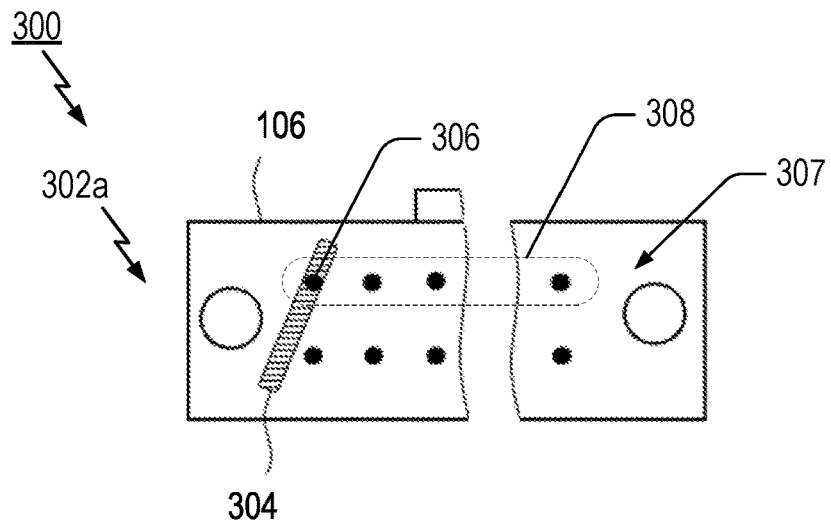
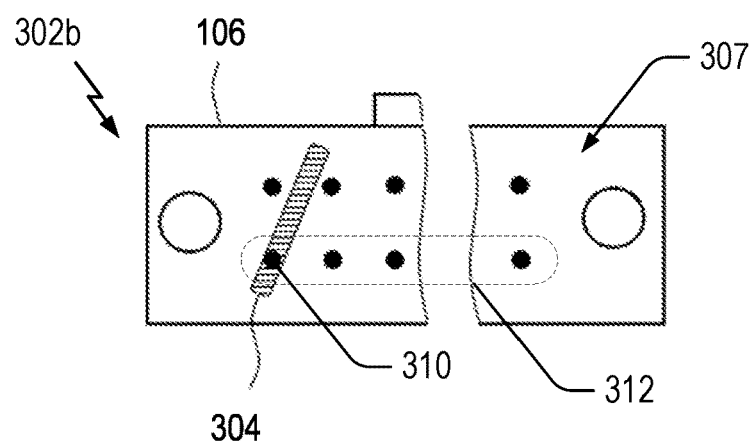
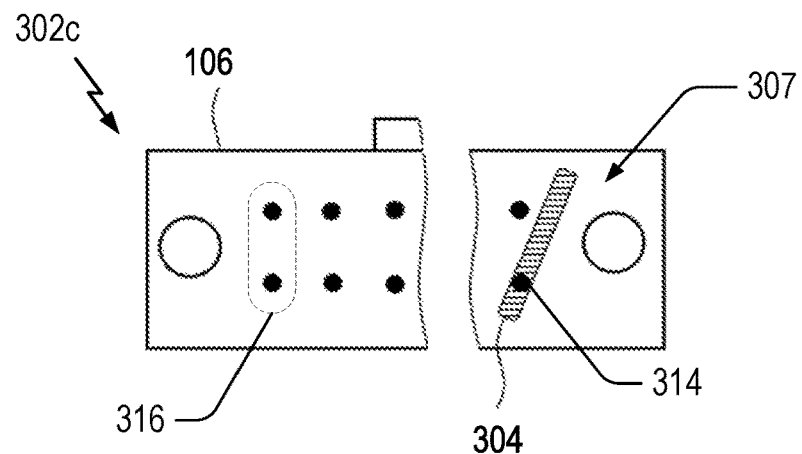
FIG. 3

APPARATUS AND METHODS FOR CHANNEL VERIFICATION OF MULTI-FIBER OPTIC CABLE

BACKGROUND

Field

The present disclosure generally relates to the verification of multi-fiber cables, and more specifically to verification of Multi-fiber Push On (MPO) connectors including identifying a polarity type of a multi-fiber cable and fiber optic channel location in MPO connectors of patch-cords.

INTRODUCTION

Multi-fiber push on connectors (MPOs) are fiber connectors comprised of multiple optical fibers. Defined as an array connector having more than two fibers, MPOs are typically available with 8, 12, or 24 fibers for common data center and LAN applications. Other fiber counts are available such as 16, 32, 48, 60, or even 96 fibers, but these are typically used for specialty super high-density multi-fiber arrays in large scale optical switches.

In order for fiber links to properly send data, the transmit signal (Tx) at one end of the cable must match the corresponding receiver (Rx) at the other end. To ensure proper transmission and reception, polarity schemes are used to ensure a continuous connection, and this becomes more complex when dealing with multi-fiber components. In particular, different from common fiber patch cords, an MPO connector terminates multiple fibers in a single high-density interface, which leads to even higher complexity for managing the polarity of the respective fibers inside the MPO. To match different fiber positions, the Telecommunications Industry Association (TIA) standards have defined three types of polarity MPO cables: Type-A, Type-B, and Type-C. Additionally, industry standards call out three different polarity methods: Method A, Method B and Method C, and each of these methods uses a different MPO cable type.

Specifically, Method A uses a Type A straight-through MPO trunk cable with a key up connector on one end and a key down connector on the other end so that the fiber located in Position 1 arrives at Position 1 at the other end. When using Method A for duplex applications, a patch cord is required in at one end in order to accomplish a transceiver-receiver flip. Method B uses key up connectors on both ends to achieve the transceiver-receiver flip so that the fiber located in Position 1 arrives at Position 12 at the opposite end, the fiber located in Position 2 arrives at Position 11 at the opposite end, and so forth. For duplex applications, Method B uses straight A-B patch cords on both ends. Method C uses a key up connector on one end and a key down on the other end like Method A, but the flip happens within the cable itself where each pair of fibers is flipped so that the fiber in Position 1 arrives at Position 2 at the opposite end and the fiber in Position 2 arrives at Position 1. While this method works well for duplex applications, it does not support parallel 8-fiber 40 and 100 Gig applications and is, therefore, not recommended.

With three different polarity methods and the need to use the correct type of patch cords for each method, deployment mistakes may be common. In order to mitigate mistakes, specially designed equipment are known for polarity verification. Such equipment, however, requires the purchase of additional equipment, thus making verification and maintenance more complex and more expensive.

SUMMARY

The present invention provides apparatus and methods for channel and polarity verification of multi-fiber optic cables, such as MPO cables or patch-cords. A verification module, in particular, includes an illumination source and a motion drive for alignment the illumination source with end faces of optic fiber in the multi-fiber optic connector. When illuminated according to predetermined sequences or time modulations, an inspection microscope at the other end of the MPO cable or patch-cord may be used to verify the channels and/or polarity of the fibers within the MPO cable.

According to a particular aspect, an apparatus for providing channel verification for a fiber optic cable having multiple channels is disclosed. The apparatus includes a verification module optically couplable to a first fiber optic connector located at a first end of the fiber optic cable. Furthermore, the verification module includes an illumination source configured to direct the light to an end face of at least one fiber in the first fiber optic connector to illuminate the at least fiber, and a motion drive configured to move at least one of the illumination source with respect to the first fiber optic connector. The verification module is configured to illuminate the at least one fiber to allow an inspection microscope optically coupled to a second end of the fiber optic cable opposite to the first fiber optic connector to inspect the at least one fiber of the fiber optic cable for channel verification.

According to another aspect, a method for providing channel and/or polarity verification for a fiber optic cable having multiple channels is disclosed. The method includes illuminating a first fiber in a first fiber optic connector located at a first end of the fiber optic cable with an illumination source configured to direct the light to an end face of the first fiber in the first fiber optic connector. Additionally, the method includes moving at least one of the illumination source with respect to the first fiber optic connector with a motion drive, and illuminating at least a second fiber in the first fiber optic connector with the illumination source. The illumination of the first and at least second fibers allow an inspection microscope optically coupled to a second end of the fiber optic cable opposite to the first fiber optic connector to inspect the fibers of the fiber optic cable for channel verification based on a predetermined sequence of illumination of the first and at least second fibers.

BRIEF DESCRIPTION OF THE DRAWINGS

FIG. 1 shows a side view of an MPO channel verification tool usable with an MPO connector in an MPO cable system.

FIG. 3 illustrates a method for illumination of fibers in an MPO connector by focusing a light beam in the shape of a tilted narrow rectangle.

DETAILED DESCRIPTION

Figure 2A:
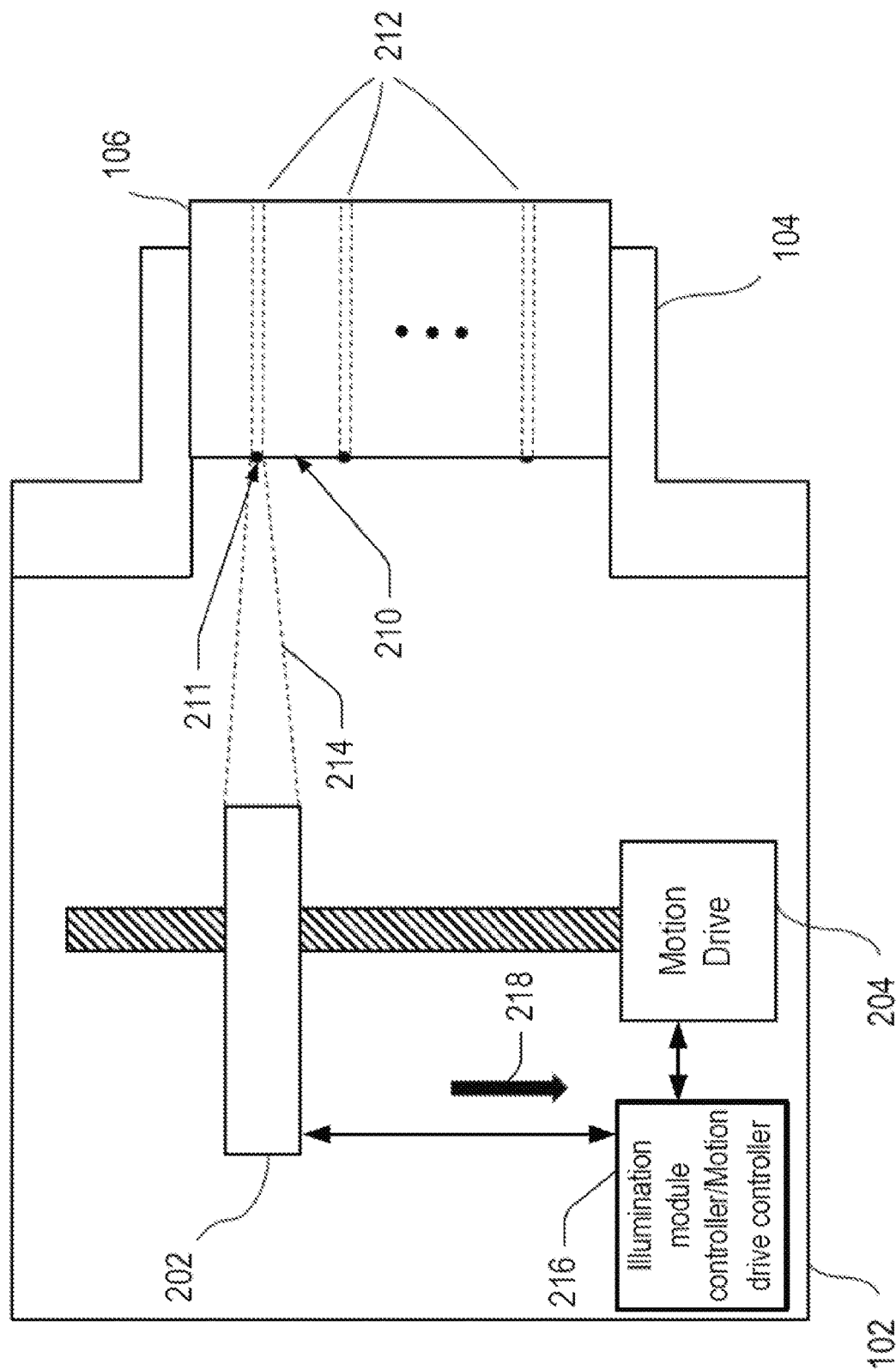
FIG. 2A shows a schematic view of an MPO verification tool.

The present invention describes a method and apparatus for polarity verification of MPO cables/patch-cords as well as each fiber optic channel location while applying standard microscopes (termed herein "inspection microscopes") for inspection of the MPO connectors. It is noted that inspection microscopes designed for testing MPO connections can be used to visually inspect the connector end face of a connector for scratches, defects and contamination, as well as for automatic Pass/Fail testing based on IEC standards.

The presently methods and apparatus utilize illumination modules that provide a high luminosity light source for use with commonly available optic fiber inspection microscopes to identify optic channels in MPO cables/patch-cords. In particular, the disclosed illumination modules include a motion drive for repositioning the high luminosity light source to illuminate one or more optic fibers in the MPO connectors one by one in a predetermined sequence. In such case, the inspection microscope performs detection of luminous optic fibers on the other end of MPO cable/patch-cord even for the maximum length allowed, and provides information about the polarity type of the MPO cable/patch-cord, as well as each fiber optic channel location.

It is noted that for the sake of clarity, some mechanical and optical elements may be omitted in the present figures in order to better emphasize inventive aspects of the illustrative embodiments.

Turning to FIG. 1, this figure illustrates an MPO cable fiber optic system 100 including the use of a verification module or apparatus. As shown, a verification unit or module 102 is connected to an MPO connector 106 with an appropriate connector holder or adapter 104 at one end of an MPO cable 108. An optic fiber inspection microscope 114 is connected to another MPO connector 110 by an appropriate connector holder 112 at the other end of the MPO cable 108. In a verification operation, the verification module 102 and the inspection microscope 114 are coupled to the different ends of the MPO cable 108 for performing verification of the polarity of the MPO cable 108.

FIG. 2A illustrates further details of one example of the verification module 102 shown in FIG. 1. The verification module 102 includes an illumination source, unit, or module 202, a motion drive or driver 204, and the MPO connector holder 104. In an aspect, the illumination source 202 may be configured to direct or shape a light beam (visualized by dashed lines 214) to an end face 210 of at least one fiber in a first fiber optic connector (i.e., MPO connector 106) to illuminate the at least one fiber. In particular, the illumination source 202 may be configured to specifically direct the light beam 214 to an end face 211 of a fiber in the fiber optic connector 106. The motion drive 204 is further configured to move the illumination source 202 with respect to the fiber optic connector 106 in order to direct the light beam 214 to different end faces of the various fibers in the fiber optic connector 106. In aspects, the illumination unit or source 202 may comprise any of various known light sources such as an LED or a laser, as merely two examples.

Figure 2B:
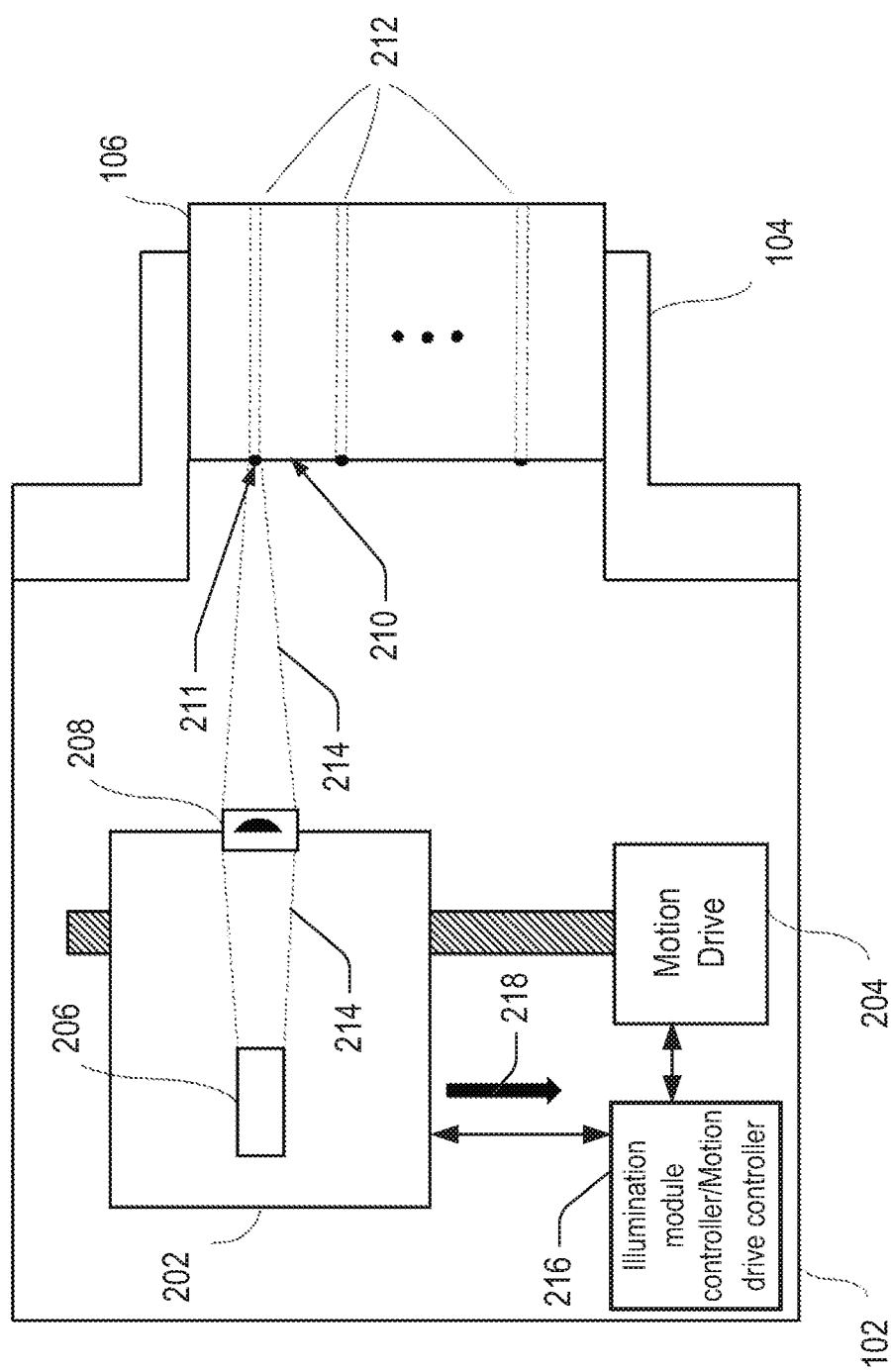
FIG. 2B shows a schematic view of another embodiment of the MPO verification tool.

In further aspects, another example of the verification module 102 is illustrated in FIG. 2B. In addition to components of the system of FIG. 2A, the example of FIG. 2B further includes one or more lenses, lens systems or any other optical components 208 configured for collimating, shaping, and projecting a light beam (visualized by dashed lines 214) from the light source 206 onto the end face 210 of the MPO connector 106 in order to illuminate at least end faces 211 of the one or more single fibers 212 of the MPO connector 106. The motion drive 204, in particular, is used to move the illumination unit 202 with respect to the MPO connector 106 in order to illuminate the fiber 212 according to predefined patterns or motions for illumination, as will be described in more detail below.

In certain embodiments of the system of FIG. 2B, the illumination unit 202 may have only one or more individual light sources 206 that are configured to direct the light therefrom onto the end face 210 without the use of a shaping, or collimating type lens (e.g., lens 208). Examples of such light sources 206 include lasers or VCSELs. According to other aspects, the illumination unit 202 will include the one or more lenses 208 to collimate, shape, and project light beams from the light sources 206, and the light source 206 and lenses 208 are moved in concert by the motion drive 204. In yet other embodiments, however, the verification module 102 may include an illumination unit 202 having one or more light sources 206 that are mechanically uncoupled or separated from the lenses 208 (either within an illumination unit 202 or apart from such unitization), where the motion drive 204 may be configured to move only one of the illumination source 206 or the lenses 208 to achieve specific illumination of the end faces of individual fibers.

The motion drive 204 in either of the systems of FIGS. 2A and 2B may include a motor or actuator device controller or control circuitry 216 to cause motion of the illumination unit 202 according to the predefined patterns (e.g., along an axis of motion shown by arrow 218, but not limited to such single dimensional motion). The motion drive 204 may include a stepper motor with a lead screw; a rack and pinion gearing; a slider-crank mechanism; a plate, cylindrical, or linear cam drive with a fixed-axis follower; combinations thereof; or any other mechanism that may be used to effect linear motion. It is further noted that control circuitry 216 may also include a controller for the illumination unit 202 (or, alternatively, a separate controller could also be provided for the motion drive and illumination unit in other embodiments).

According to an aspect, a method for illumination of the connector 106 of the MPO cable 108 is shown in FIG. 3. In this example, light from the light source 206 in the illumination unit 202 is shaped into a predetermined illumination pattern or form and projected onto specific fibers 212 of the MPO connector 106 one at a time through use of the motion drive. In particular, the motion drive 204 is configured to perform a one-axis movement of the illumination unit 202 parallel with the connector end face plane 307 and along the rows of fibers 212. The figure illustrates that at a first time instance 302a, the light beam from the illumination or light source 206 is focused in the form of a tilted narrow rectangle 304 to illuminate a fiber 306 of a first row 308 at a certain positioning of the illumination unit 202 as positioned by the motion drive 204. In another time instance 302b, the illumination unit 202 is positioned to illuminate a fiber 310 of a second row 312 of the connector 106 with the rectangle 304. The process continues until a desired number of fibers has been illuminated, which is typically all of the fibers. Time instance 302c illustrates the example where a last fiber 314 in a last row of the connector is illuminated, assuming a sequential left to right movement of the light beam formed as rectangle 304. As will be appreciated by those skilled in the art, by using a rectangle pattern 304 at a certain angle other than at a vertical 90 degrees with rows of fibers spaced within to also form an array with columns of fibers in line (See e.g., 316), the illumination source 202 may be simply moved in one dimension (i.e., a single axis of movement) and still be able to individually illuminate each fiber without simultaneously illuminating another fiber by ensuring that fibers in another row (e.g., 308) are not illuminated by the pattern 304. That is, such the motion drive 204 may move the light source 206 and/or lens 208 in a horizontal axis perpendicular to the vertical axis (e.g., the X axis, which is perpendicular to the vertical Y axis) the illumination pattern 304 only illuminate one fiber in the first fiber optic connector at one position.

During the processes illustrated in FIG. 3, the inspection microscope 114 performs optical inspection of the MPO connector 110 of the MPO cable 108. In particular, the inspection microscope 114 captures the magnified image the end face of the MPO connector 110 and analyzes the sequence of luminous fibers, taking into account the illumination of optic fibers on the other end of the MPO cable 108 in determined sequence. Based on this analysis, the microscope provides polarity verification of MPO cable 108 and fiber optic channel locations in the MPO cable 108. In particular, polarity verification of the MPO patch-cord involves identifying the positions of fibers on one side of a patch-cord that correspond to specific fibers on the other side of the patch-cord (e.g., fiber No. 1 and fiber No. 2 of the MPO connector). This polarity verification using the inspection may be implemented by an algorithm that provides a predetermined illumination of the fibers, such as a predetermined sequence of illumination or a time modulated illumination. Additionally, the algorithm may be implemented one time or, alternatively, may be implemented in a looped mode that repeats. Additionally, the inspection microscope can be programmed to identify the type of polarity without any communication with the verification module through a pre-programmed a priori knowledge of the predetermined identification sequence or time modulation of illumination of the fibers. In another alternative aspect, the identification and location of the fibers may, in general, be provided through a synchronous operation of the inspection microscope and the verification apparatus using an appropriate communication interface such as Ethernet, Wi-Fi, Internet, etc.)

In alternative embodiments, it is noted that the illumination unit 202 may be configured to project a light beam that illuminates a single fiber at one position of the illumination unit 202. In this case, the motion drive 204 is configured to perform a two-axis movement of the illumination unit 202 parallel to the MPO connector end face plane 307 along both the rows and columns of optical fibers to provide illumination of all required fibers one by one in determined sequence.

In yet other embodiments, the illumination unit 202 may comprise an array of light sources arranged linearly to provide illumination of all fibers arranged in a single row (or column) in the MPO connector 106, as examples. To illuminate those fibers arranged in another row or column in the MPO connector 106, the motion drive 204 is configured to shift the illumination unit 202 along the plane 307 parallel to the end face of MPO connector 106 to the next linear row or column.

Figure 4:
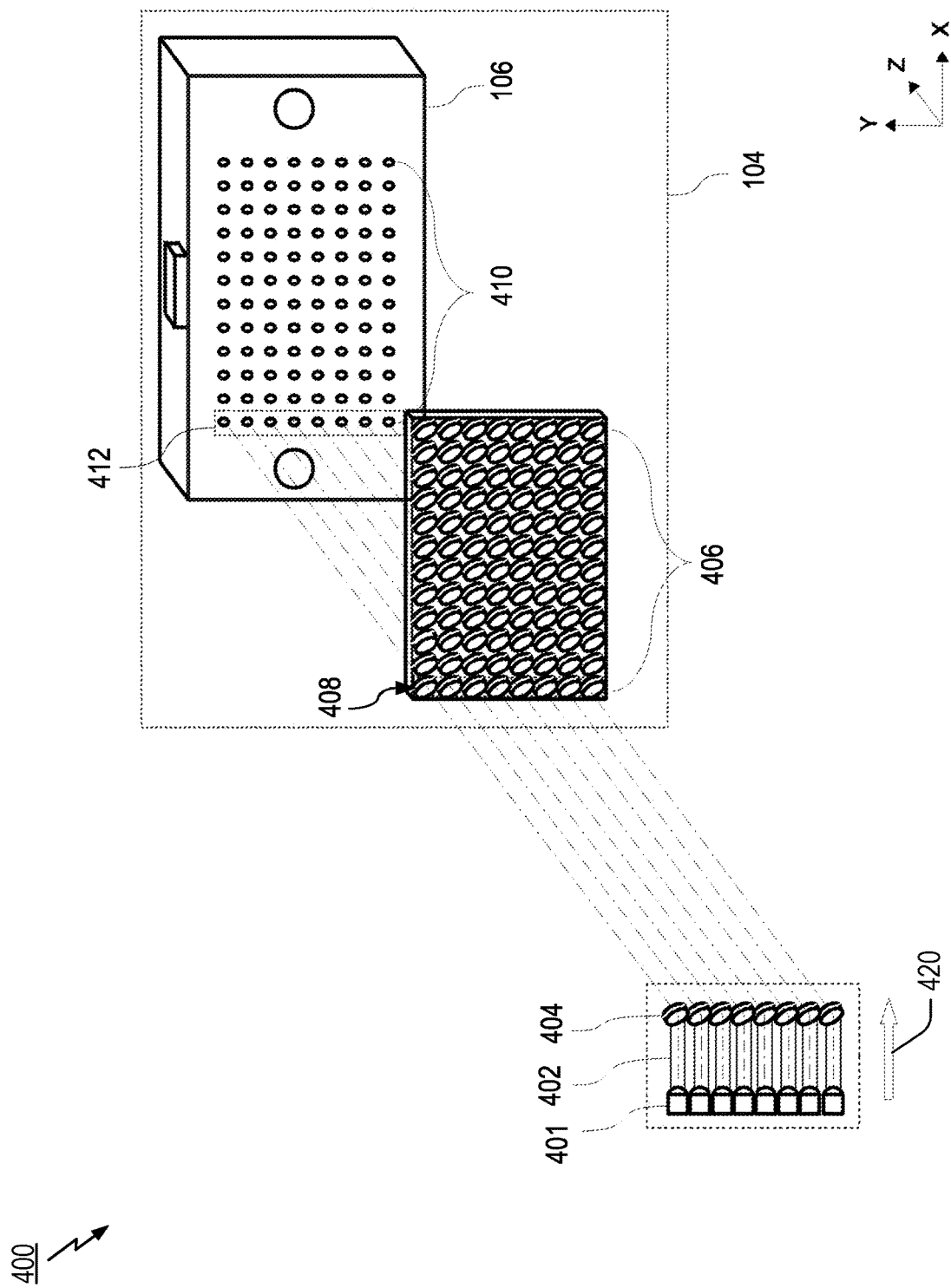
FIG. 4 shows a schematic view of an optical system using an illumination module with an array of light sources to provide column illumination.

FIG. 4 illustrates a further example of a system 400 where a light source 401 includes a number of separate light sources, such as LEDs (with eight light sources shown in the example, but not limited to such) arranged in a linear array, but not necessarily limited to such. The separate light sources in the light source 401 are optically coupled by respective transmission optic fibers 402 to an array of lenses 404 for collimating, shaping, and projecting a light beam. The array of lenses 404 provides optical alignment without physical contact with a lens array 406 containing a number of lenses that are configured to be placed in the MPO adapter 104. In one example, the lens array 406 may include 96 lenses (i.e., an array of 12×8 individual lenses) placed or disposed in the MPO adapter 104. The MPO adapter 104 is further configured to provide precise optical alignment of each lens of the lens array 406 with a respective fiber of an m row×n column array of fibers 410, such as an array of 96 fibers in an 8 row×12 column array, within the connected MPO connector 106. In particular, it is noted that the array of lenses 404 may be configured in a linear 1×n array arrangement with n being the total number of lenses, and wherein the array 404 is configured to align with an entire column 412 of the array of fibers 410 thereby providing alignment for illumination of an entire column without the need to move the light source 401 and array 404 for the batch of fibers to be verified.

Although not shown in FIG. 4, the connector or adapter 104 is coupled to verification module 102, which may include the light source 401, the transmission optic fibers 402, and the array of lenses 404. Furthermore, referring back to FIG. 1, it is also noted that the MPO connector 110 on the other end of the MPO cable 108 is connected to the inspection microscope 114, which is used to perform inspection and verification in conjunction with the verification module 102. Additionally, it is noted that the transmission optic fibers 402 may be configured to be flexible and movable such that only the array of 404 (or alternatively the light source 401) need only be moved, such as with motion drive 204, for example.

Figure 5:
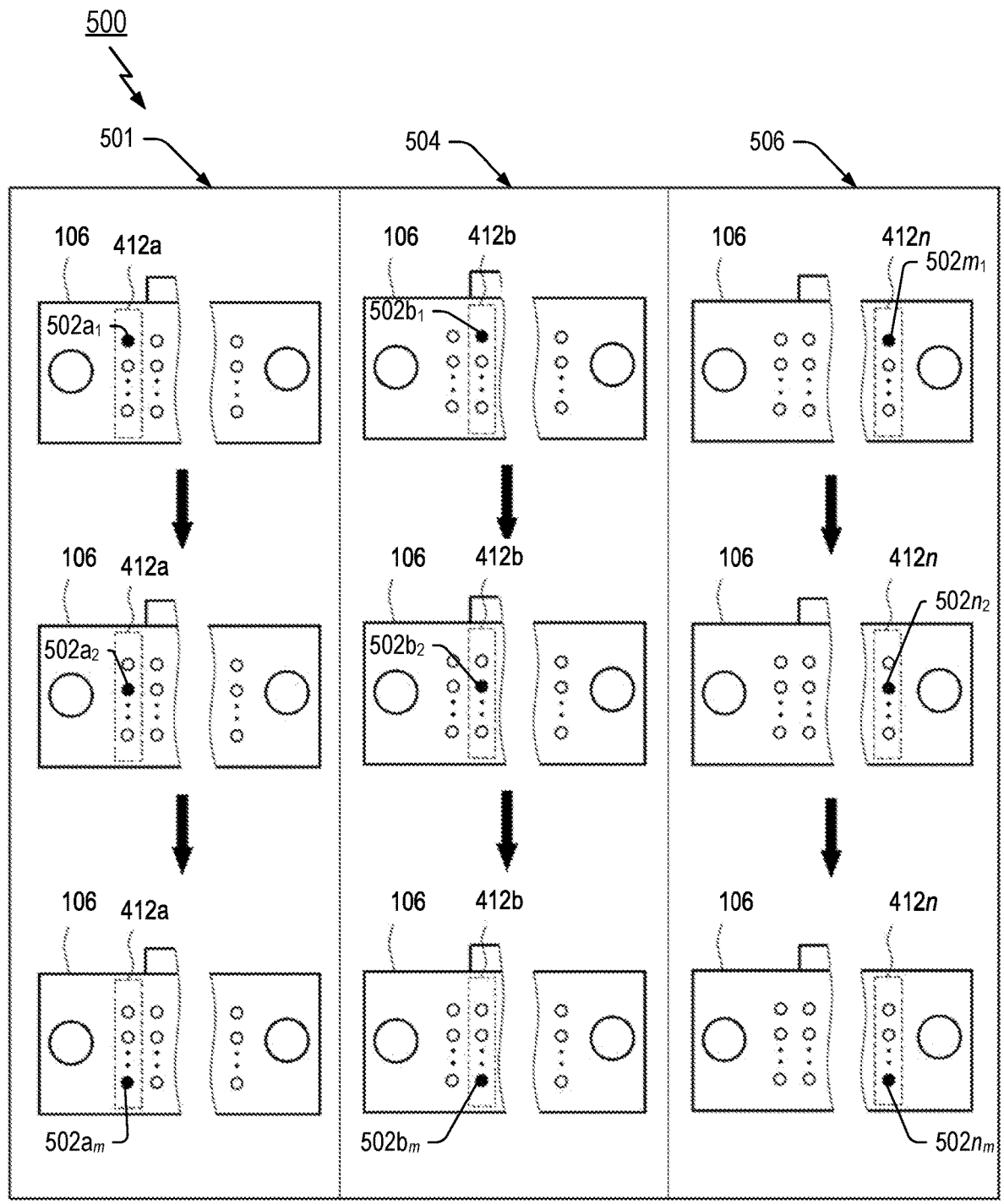
FIG. 5 illustrates a method of column illumination for channel verification in an MPO connector utilizing the system illustrated in FIG. 4.

FIG. 5 illustrates a particular method or process 500 using the apparatus of FIG. 4 where column illumination is utilized. As shown at a first time instance 501, the light source 401 and the array of lenses 404 are aligned with a first column of the lens array 406 (See e.g., column 408 in FIG. 4) to illuminate a first column 412a of the fibers in the array 410 in the MPO connector 106. In an aspect, the light source 401 and the array of lenses 404 are aligned with the lens array 406 and the column 412a using the motion drive 204 and associated control circuitry controlling the motion drive 204 (e.g., control circuitry 216). The individual light sources in light source 401 may be individually switched on in a predetermined sequence allowing the inspection microscope 114 to perform identification and/or verification of a first batch of the illuminated optic fibers (i.e., the first column of fibers 412a). For example, the fibers $502a_1$ through $502a_m$ in column 412a may be illuminated sequentially or in some predefined pattern or order. In other embodiments, two or more of the fibers 502 may be illuminated at one time by turning on multiple lights within the light source 401 simultaneously.

At another time instance 504, the light source 401 having multiple light sources and the array of lenses 404 are aligned by the motion drive 204 with another column of the lens array 406 in order to illuminate a second column 412b of fibers in the array 410 in the MPO connector 106. In one aspect, the light source 401, optic fibers 402, and lens array 404 are moved in a single axis of motion as indicated by arrow 420 in FIG. 4, but the embodiment is not necessarily limited to such motion or axis. Again, by switching on the individual light sources in the light source 401 according to a predetermined sequence, the inspection microscope 114 may then perform identification and/or verification of a next or second batch of luminous optic fibers in the array 410 (i.e., the fibers $502b_1$ through $502b_m$, in column 412b). The process continues until a last or $n^{th}$ column of fibers 412n of the MPO connector 106 are illuminated as shown at time instance 506 (i.e., fibers $502n_1$ through $502n_m$). Based on these processes, the inspection microscope may then analyze the sequence of fibers as they are illuminated to then determine polarity verification of the MPO cable or patch-cord 108, as well as verification of the fiber optic channel locations in the MPO cable or patch-cord 108.

Figure 6:
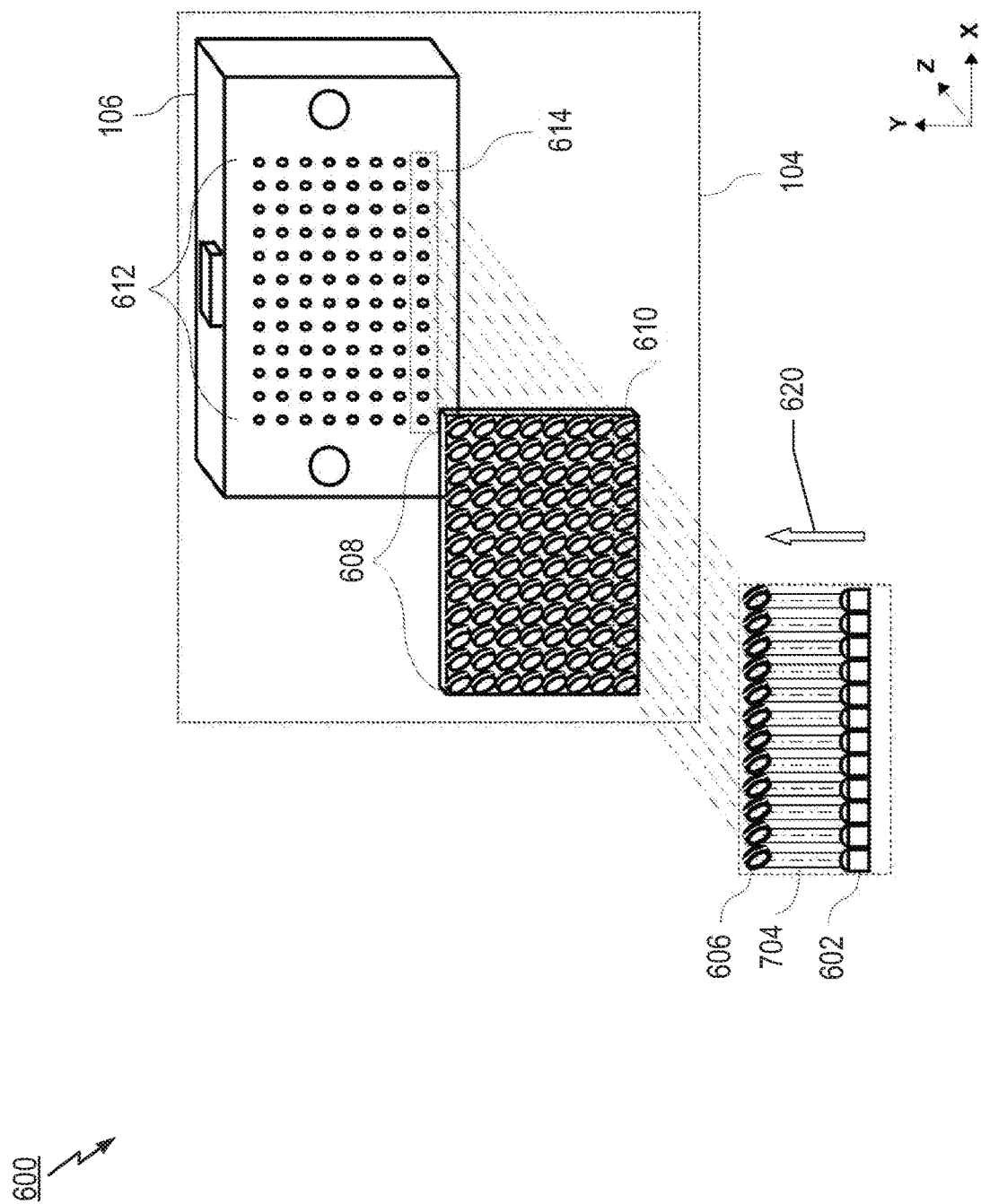
FIG. 6 shows a schematic view of an illumination module used to provide a row illumination method.

FIG. 6 illustrates another exemplary apparatus 600 for MPO channel and polarity verification that utilizes row illumination. The apparatus 600 features a light source 602 having a multiple number of individual light sources (LEDs for example) that are optically coupled by optic fibers 604 to an array of lenses 606. The array of lenses 606 provides a non-physical optical alignment with a lens array 608, which may be coupled with, placed within, or mounted on the MPO adapter 104. In one example, the lens array 608 may comprise in an m row by n column array (i.e., 96 lenses 8 rows by 12 columns of lenses, with a single row demarcated at 610, for example). The MPO adapter 104 provides precise optical alignment of each lens of the lens array 608 with a corresponding fiber of the connected MPO connector 106 including an array of fibers 612, such as an array of 96 fibers in a 12×8 array within the connected MPO connector 106 that matches the lens array 608. Also, it is noted that the array of lenses 606 may be configured in a 1×n array arrangement with n being the total number of lenses, and wherein the array 606 is configured to align with an entire row 614 of the array of fibers 612 (via lens array 608) thereby providing alignment for illumination of an entire row without the need to move the light source 602 and array 606 for the batch of fibers to be verified.

The connector or adapter 104 is coupled to verification module 102, which may include the light source 602, the transmission optic fibers 604, and the array of lenses 604. Additionally, the motion drive 204 is configured to move these elements 602, 604, and 606 together along a single axis indicated by arrow 620 for the example of FIG. 6. It is also noted that the MPO connector 110 on the other end of the MPO cable 108 is coupled to the inspection microscope 114, which is used to perform inspection and verification in conjunction with the verification module 102.

Figure 7:
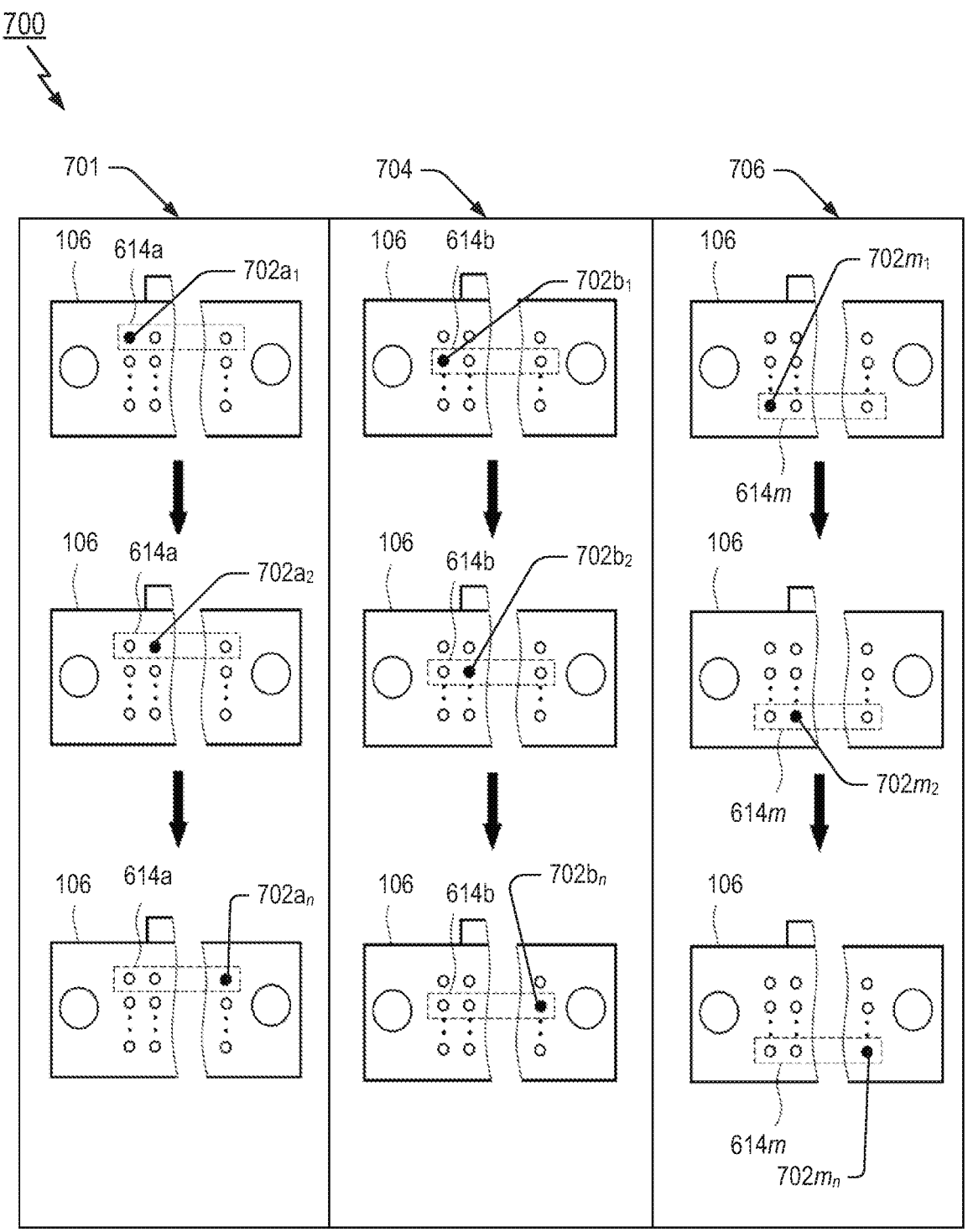
FIG. 7 illustrates a method for row illumination for channel verification in an MPO connector utilizing the illumination module illustrated in FIG. 4.

FIG. 7 illustrates a particular method or process 700 using the apparatus of FIG. 6 where row illumination is performed. As shown at a first time instance 701, the light source 602 and the array of lenses 606 are aligned with a row of the lens array 608 (See e.g., row 614 in FIG. 6) to illuminate the row. In this case at time 701, a first row 614a of the fibers in the array 612 in the MPO connector 106 are illuminated. In an aspect, the light source 602 and the array of lenses 606 are aligned with the lens array 608 and the row 614a using the motion drive 204 and associated control circuitry controlling the motion drive 204 (e.g., control circuitry 216). The individual light sources in light source 602 may be individually switched on in a predetermined sequence allowing the inspection microscope 114 to perform identification and/or verification of a first batch of illuminated optic fibers. For example, the fibers $702a_1$ through $702a_m$ in row 614a may be illuminated sequentially or in some predefined pattern or order.

At another time instance 704, the light source 602 having multiple light sources and the array of lenses 606 are aligned by the motion drive 204 with another row of the lens array 608 in order to illuminate a second row 614b of fibers in the array 612 in the MPO connector 106. In one aspect, the light source 602, optic fibers 604, and lens array 606 are moved in a single axis of motion as indicated by arrow 620 in FIG. 6, but the embodiment is not necessarily limited to such motion or axis. Again, by switching on the individual light sources in the light source 602 according to a predetermined sequence, the inspection microscope 114 may then perform identification and/or verification of a next or second batch of illuminated optic fibers in the array 612 (i.e., the fibers $702b_1$ through $702b_{12}$ in row 614b). The process continues until a last or $m^{th}$ row of fibers 614m of the MPO connector 106 are illuminated as shown at time instance 706 (i.e., fibers $702m_1$ through $702m_n$). Based on these processes, the inspection microscope may then analyze the sequence of fibers as they are illuminated to then determine polarity verification of the MPO cable or patch-cord 108, as well as verification of the fiber optic channel locations in the MPO cable or patch-cord 108.

Figure 8:
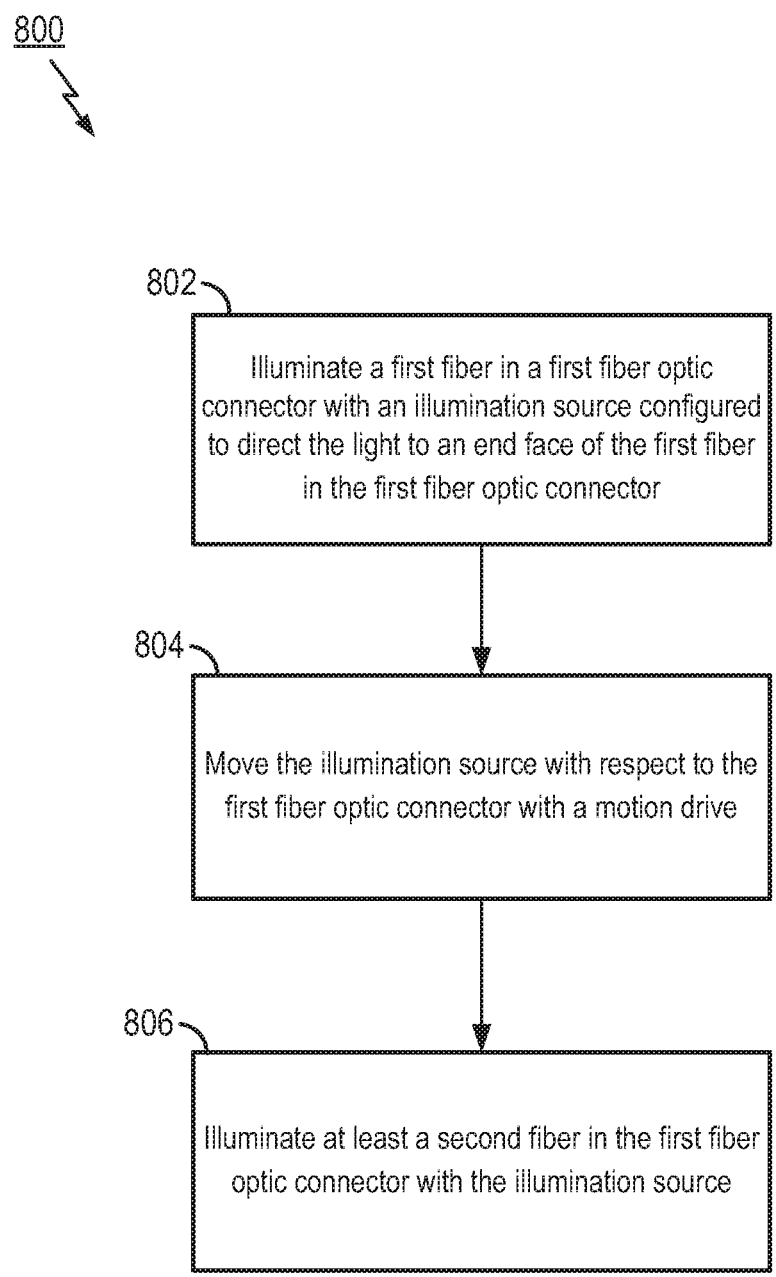
FIG. 8 illustrates another method for channel verification in a fiber optic connector according to yet further aspects of the present disclosure.

FIG. 8 illustrates a further method 800 for providing channel verification for a fiber optic cable having multiple channels. As shown at a first block 802, method 800 includes illuminating a first fiber in a first fiber optic connector located at a first end of the fiber optic cable with an illumination source configured to direct the light to an end face (e.g., 211) of the first fiber in the first fiber optic connector. The process of block 802 may be effectuated with the verification unit or module 102 and the various componentry within such as light sources 206, 401, or 602 and lens(es) 208, 404 or 606. It is noted that during the process of block 802, the inspection microscope 114 at the other second end of the fiber optic cable (e.g., 108) may then perform analysis of the illuminated first fiber to determine or verify the channels and polarity of the cable.

After the process of block 802 (and collection of data by the inspection microscope), the illumination source are moved with respect to the first fiber optic connector with the motion drive as shown in block 804. The process of block 802 may be effected with the motion drive 204, as well as a controller (e.g., motion drive controller 216). In further aspects, the controller may move the illumination source in the direction of a single axis or in multiple directions (e.g., X and Y axes) according to predetermined sequences of movement for at the illumination or light sources (e.g., light source(s) 206 in the illumination unit 202). It is noted, however, in other embodiments the controller 216 may be configured to cause the illumination unit 202 to move as a whole to move the light source or, alternatively, individually move either the light sources 206 or the lenses 208.

After moving at least the illumination or light source (e.g., 206) at block 804, method 800 includes illuminating at least a second fiber in the first fiber optic connector with the illumination source as shown at block 806. It is noted that the processes of method 800 allow an inspection microscope optically coupled to a second end of the fiber optic cable opposite to the first fiber optic connector to be able to inspect the fibers of the fiber optic cable for channel verification. Furthermore the illumination or light source (e.g., 206) or illumination unit 202 may be configured to use a predetermined sequence of illumination of the first and at least second fibers, where the inspection microscope is pre-programmed with knowledge of such predetermined sequence and the analysis is based thereon.

According to other aspects, method 800 includes the second end of fiber optic cable includes a second fiber optic connector and the inspection microscope is optically coupled with the second fiber optic connector and configured to capture a magnified image of an end face of first and at least second fibers in the second fiber optic connector. Additionally, the inspection microscope may be configured to analyze each of the optic fibers illuminated according to the predetermined sequence of illumination and verify the fiber optic channel locations within the fiber optic cable and the polarity of the fiber optic channels in the fiber optic cable based on the predetermined sequence of illumination. In further aspects, the first fiber optic connector is a Multi-fiber Push On (MPO) connector and the fiber optic cable is an MPO patch cord.

According to other aspects, method 800 may include providing the illumination source with a plurality of individual light sources, and providing the at least one lens with a plurality of individual lenses optically coupled with and corresponding to respective individual light sources in the plurality of individual light sources. Additionally, method 800 may include illuminating the end faces (e.g., 211) of the first and at least second fibers in the first fiber optic connector using the plurality of individual light sources and the plurality of individual lenses. Still further, method 800 may include providing an array of lenses coupled with the first fiber optic connector and optically coupled with the plurality of individual lenses, wherein the array of lenses is configured to optically align with respective fibers in an array of fibers in the first optic connector.

Method 800 may also include the plurality of individual lenses arranged linearly and configured to be optically coupled with a column of lenses in the array of lenses to allow illumination of a corresponding column of fibers in the array of fibers such as was illustrated in the examples of FIGS. 4-5. The plurality of individual collimating lenses may alternatively be arranged linearly and configured to be optically coupled with a row of lenses in the array of lenses to allow illumination of a corresponding row of fibers in the array of fibers such as was illustrated in the examples of FIGS. 6-7.

In still another aspect, method 800 may include forming a predetermined illumination pattern using the illumination source and the at least one lens as was disclosed in connection with FIG. 3. The pattern is arranged at a predetermined angle with respect to a vertical axis such that when the motion drive moves the illumination source and the at least one lens in an axis perpendicular to the vertical axis the predetermined illumination pattern is arranged to only illuminate one fiber in the first fiber optic connector at one position.

It is also noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, certain embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for providing channel verification for a fiber optic cable having multiple channels, the apparatus comprising:
    a verification module optically couplable to a first fiber optic connector located at a first end of the fiber optic cable, the verification module comprising:
        a connector holder configured to hold the first fiber optic connector;
        an illumination source configured to direct light to an end face of a plurality of fibers in the first fiber optic connector to illuminate the plurality of fibers, where the illumination source provides at least one fixed beam of light; and
        a motion drive configured to move the illumination source with respect to the first fiber optic connector held in the connector holder that allows the at least one fixed beam of light to be moved between at least one fiber of the plurality to at least one other fiber of the plurality of fibers;

wherein the verification module is configured to illuminate the plurality of fibers to allow an inspection microscope optically coupled to a second end of the fiber optic cable opposite to the first fiber optic connector to inspect the plurality of fibers of the fiber optic cable for channel verification.

2. The apparatus of claim 1, wherein the second end of fiber optic cable includes a second fiber optic connector and the inspection microscope is optically couplable with the second fiber optic connector and is configured to capture a magnified image of an end face of at least one optic fiber in the second fiber optic connector.

3. The apparatus of claim 1, further comprising:
the verification module configured to illuminate each of a plurality of optic fibers in the fiber optic cable according to a predefined illumination sequence; and
the inspection microscope configured to analyze each of the plurality of optic fibers illuminated according to predefined illumination sequence and verify at least one of fiber optic channel locations within the fiber optic cable and polarity of the fiber optic channels in the fiber optic cable based on the predefined illumination sequence.

4. The apparatus of claim 1, wherein the first fiber optic connector is a Multi-fiber Push On (MPO) connector and the fiber optic cable is an MPO patch cord.

5. The apparatus of claim 1, wherein the illumination source further comprises one of one or more light emitting diodes (LEDs), one or more lasers, or a vertical-cavity surface-emitting laser (VCSEL) array.

6. The apparatus of claim 1, wherein the illumination source further comprises at least one light source and at least one lens configured to direct light from the at least one light source to the end face of the plurality of fibers in the first fiber optic connector to illuminate the plurality of fibers.

7. The apparatus of claim 1, wherein the illumination source further comprises:
a plurality of individual light sources; and
a plurality of individual lenses optically coupled with and corresponding to respective individual light sources in the plurality of individual light sources and configured to respectively direct light from individual light sources in the plurality to a respective end face of plurality of fibers in the first fiber optic connector to illuminate the plurality of fibers.

8. The apparatus of claim 7, further comprising:
an array of lenses optically coupled with the first fiber optic connector and also optically coupled with the plurality of individual lenses; and
an array of fibers in the first fiber optic connector wherein the array of lenses is configured to optically align with respective fibers in the array of fibers.

9. The apparatus of claim 8, wherein the plurality of individual lenses are arranged linearly and are configured to be optically coupled with a column of lenses in the array of lenses to allow illumination of a corresponding column of fibers in the array of fibers.

10. The apparatus of claim 8, wherein the plurality of individual lenses are arranged linearly and are configured to be optically coupled with a row of lenses in the array of lenses to allow illumination of a corresponding row of fibers in the array of fibers.

11. The apparatus of claim 1, wherein the illumination source is configured to create a predetermined illumination pattern arranged at a predetermined angle with respect to a vertical axis such that when the motion drive moves the illumination source in an axis perpendicular to the vertical axis the predetermined illumination pattern is arranged to only illuminate one fiber in the first fiber optic connector at one position.

12. The apparatus of claim 1, wherein the illumination source is configured to allow:
illuminating a first fiber in a first fiber optic connector located at a first end of the fiber optic cable with at least one light source;
moving at least one of the light source with respect to the first fiber optic connector with a motion drive; and
the inspection microscope to optically couple to a second end of the fiber optic cable opposite to the first fiber optic connector to inspect the fibers of the fiber optic cable for channel verification based on a predetermined sequence of illumination of the first and at least second fibers.

13. The apparatus of claim 12, wherein the inspection microscope is configured to capture a magnified image of an end face of first and at least second fibers in the second fiber optic connector.

14. The apparatus of claim 1, wherein the inspection microscope is configured to analyze a plurality of illuminated optic fibers according to a predefined illumination sequence.

15. The apparatus of claim 1, wherein the illumination source illuminates the plurality of fibers.

16. The apparatus of claim 1, wherein the motion drive provides illumination for up to 96 fibers using a two-dimensional motion mechanism and a single light source.

* * * * *